US011967438B2

(12) United States Patent
Burns

(10) Patent No.: US 11,967,438 B2
(45) Date of Patent: Apr. 23, 2024

(54) LINED HAZARDOUS MATERIALS CONTAINER

(71) Applicants: Waste Control Specialists, LLC, Dallas, TX (US); AVANTech, Inc., Columbia, SC (US)

(72) Inventor: Dan Burns, Dallas, TX (US)

(73) Assignees: WASTE CONTROL SPECIALISTS, LLC, Dallas, TX (US); AVANTECH, INC., Columbia, SC (US)

( * ) Notice: Subject to any disclaimer, the term of this patent is extended or adjusted under 35 U.S.C. 154(b) by 923 days.

(21) Appl. No.: 16/580,485

(22) Filed: Sep. 24, 2019

(65) Prior Publication Data

US 2020/0098484 A1 Mar. 26, 2020

Related U.S. Application Data

(60) Provisional application No. 62/735,457, filed on Sep. 24, 2018.

(51) Int. Cl.

| | |
|---|---|
| ***G21F 5/002*** | (2006.01) |
| ***B65D 88/08*** | (2006.01) |
| ***B65D 88/16*** | (2006.01) |
| ***B65D 90/04*** | (2006.01) |
| ***G21F 9/36*** | (2006.01) |

(52) U.S. Cl.

CPC ............. *G21F 5/002* (2013.01); *B65D 88/08* (2013.01); *B65D 88/1681* (2013.01); *B65D 90/041* (2013.01); *G21F 9/36* (2013.01)

(58) Field of Classification Search

CPC .. B65D 90/027; B65D 90/046; B65D 90/041; B65D 88/52; B65D 88/522; B65D 88/524; G21F 5/002

USPC .......................................................... 588/16

See application file for complete search history.

(56) References Cited

U.S. PATENT DOCUMENTS 5,547,331 A * 8/1996 Podd ......................... B60P 1/60 141/10
5,564,833 A * 10/1996 Proffitt ............... B65D 88/1618 383/105
5,938,338 A * 8/1999 McDonough ...... B65D 88/1618 383/117
6,305,845 B1 * 10/2001 Navin ................ B65D 88/1618 383/71
7,073,676 B1 7/2006 Town
8,894,281 B2 11/2014 Town et al.
8,894,282 B2 11/2014 Town et al.
9,056,710 B1 6/2015 Strickland et al.
9,365,345 B2 6/2016 Town et al.
2013/0193164 A1 * 8/2013 Tom ....................... B65D 37/00 222/105
2016/0130078 A1 * 5/2016 Galvin ............... B65D 90/0066 141/1

* cited by examiner

*Primary Examiner* — Anthony D Stashick
*Assistant Examiner* — Raven Collins
(74) *Attorney, Agent, or Firm* — Pillsbury Winthrop Shaw Pittman LLP

(57) ABSTRACT

Provided is a device and method for containing hazardous waste, including a container for hazardous waste, comprising a hangable bag having an interior volume, the hangable bag being constructed at least in part of collapsible material and configured to be lifted and configured to support an interior bladder, and the interior volume being variable; and an interior bladder, the interior bladder connectable with a through port to a lid.

9 Claims, 20 Drawing Sheets

1300

LINED HAZARDOUS MATERIALS CONTAINER

CROSS REFERENCE TO OTHER APPLICATIONS

This application claims priority to provisional patent application No. 62/735,457, filed Sep. 24, 2018.

BACKGROUND OF THE INVENTION

1. Field

The present invention relates to systems for containing and transporting hazardous material, specifically a multi-part container for the containment, handling, and preparation for transportation and disposal of radioactive waste. The system provides improvements in radiation safety and economic advantages in packaging, transportation, and disposal operations at the generating site and disposal repository.

2. Description of the Related Art

Traditionally in the US, disposal of commercially generated low-level radioactive waste produced by nuclear reactors generating electricity has been accomplished by enclosing the waste in some form of container commonly referred to as a liner. These liners are generally made from steel or high-density polyethylene and are right cylindrical in shape with internal volumes of 100 to 220 cubic feet. Transportation of these liners in most cases is performed within a licensed transport cask, which is the genesis of the term liner.

Disposal of one of the consistently generated waste volumes, Ion Exchange Resin (IXR) sludge or other process media is usually accomplished by transferring the material from tanks in the reactor to appropriately sized liners in a slurry state. Most free standing water is then removed by direct pumping followed by removal of moisture by passing heated or dry air through the material.

The liners are designed to accept the required equipment to accomplish both the transfer IXR from the reactor tanks and the dewatering. At times, in lieu of dewatering, the disposal site operator can accept grossly dewatered IXR shipments and subsequently inject absorbent to satisfy the requirements for dry disposal product.

The typical solutions are unwieldy because of their steel or polyethylene shape, are subject to certain fatigue, result in wasted volume when not completely filled, and cannot operate in a variety of container shapes. This leads to inefficiencies in transport and disposal. As such, there is a need in the market for a solution that can solve some or all of the problems in the present market.

SUMMARY OF INVENTION

The following is a non-exhaustive listing of some aspects of the present techniques. These and other aspects are descried in the following disclosure.

Certain embodiments of the present disclosure include soft containers comprising an expandable disposal liner made of polymer fabric or other similarly pliable or flexible materials to contain, transport, store, and/or dispose of wet waste or dewatered nuclear/radioactively contaminated or otherwise hazardous waste forms generated in the commercial or government hazardous or nuclear industry for use in the industry which typically relies on steel or high-density polyethylene liners.

The expandable liner system in many of the embodiments disclosed herein is integrated with a steel transfer container lid as a hybrid package which appears as typical steel container from the outside, but contains a soft sided flexible liner on the inside to receive typical nuclear power plant wet wastes, predominantly IXR. The liner in some embodiments will fit inside the 8-120 B Cask, the smallest void dimensions of the US Type B Waste Casks and all US Waste disposal site caissons but also has the capability to have the internal flexible liner and lid removed and placed into a Modular Concrete Canister (MCC) for disposal at close to the real waste volume in the container void.

BRIEF DESCRIPTION OF FIGURES

The above-mentioned aspects and other aspects of the present techniques will be better understood when the present application is read in view of the following figures in which like numbers indicate similar or identical elements.

Figure 1:
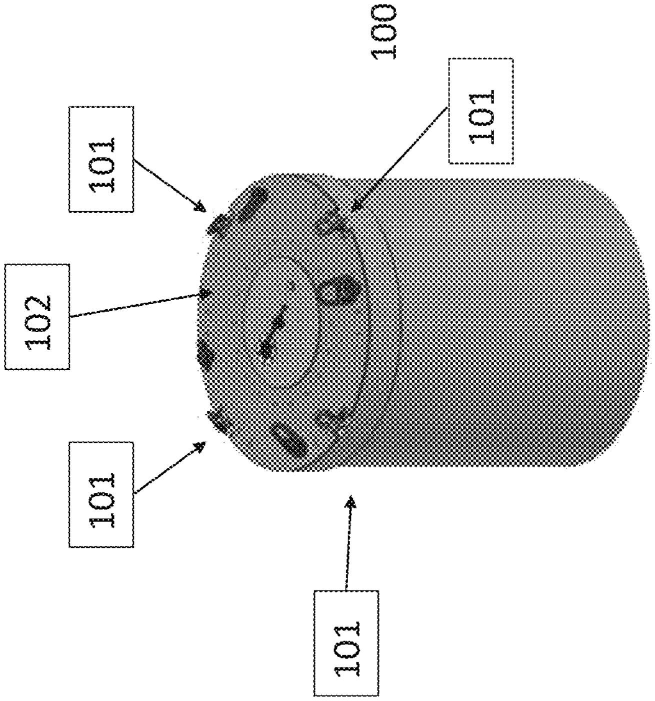
FIG. 1 is an isometric view of an embodiment of the invention.
Figure 2:
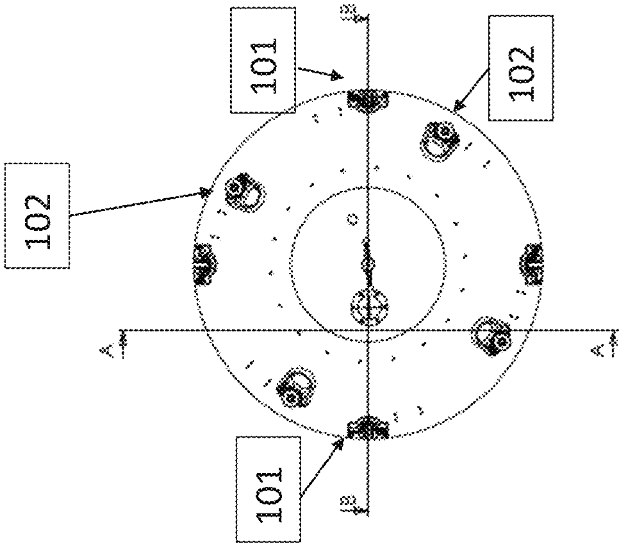
FIG. 2 is a top-down view of an embodiment of the invention.
Figure 3:
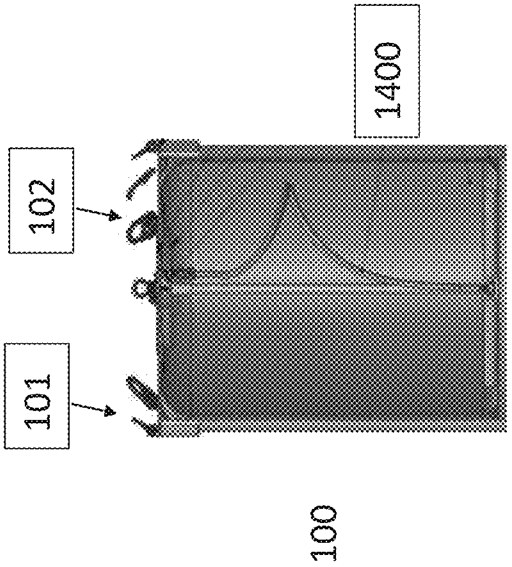
FIG. 3 is shaded sectional of the container shown in FIG. 2, taken at the A-A line.
Figure 4:
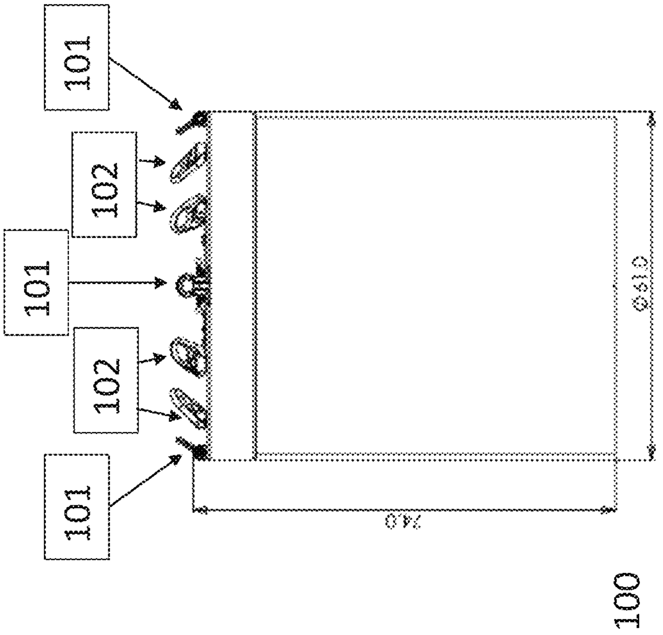
FIG. 4 is a side view of the container.
Figure 5:
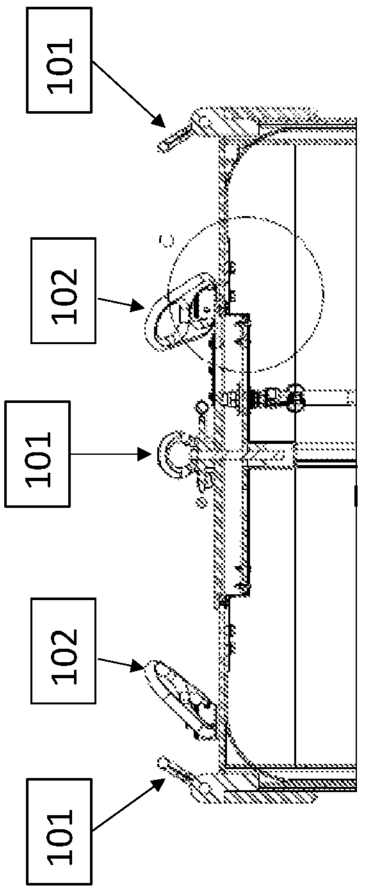
FIG. 5 is a sectional side view of a cropped portion the contained shown in FIG. 2, taken at the B-B line.
Figure 6:
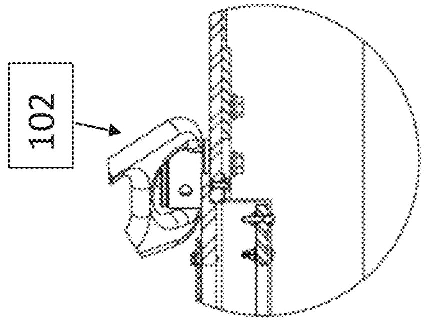
FIG. 6 is a detail of the lid and supports of the container.
Figure 7:
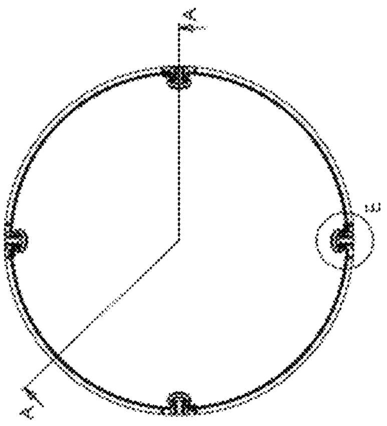
FIG. 7 is a top-down view of the reusable steel transfer container of one embodiment of this present disclosure.
Figure 8:
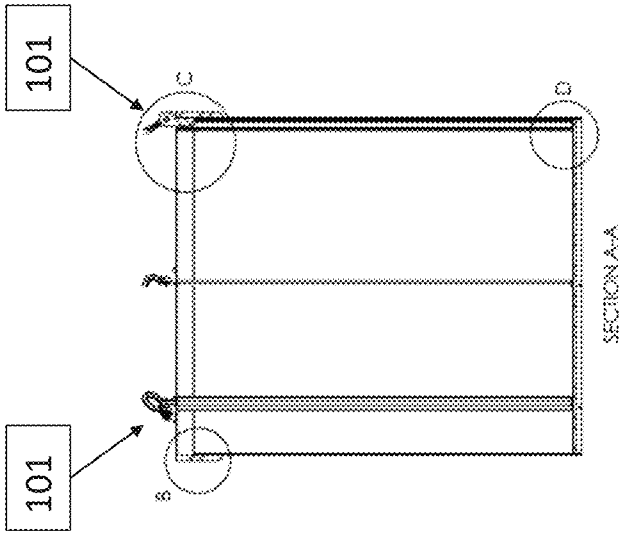
FIG. 8 is a side view of the reusable steel transfer container of one embodiment of this present disclosure.
Figures 9, 9A, 9B:
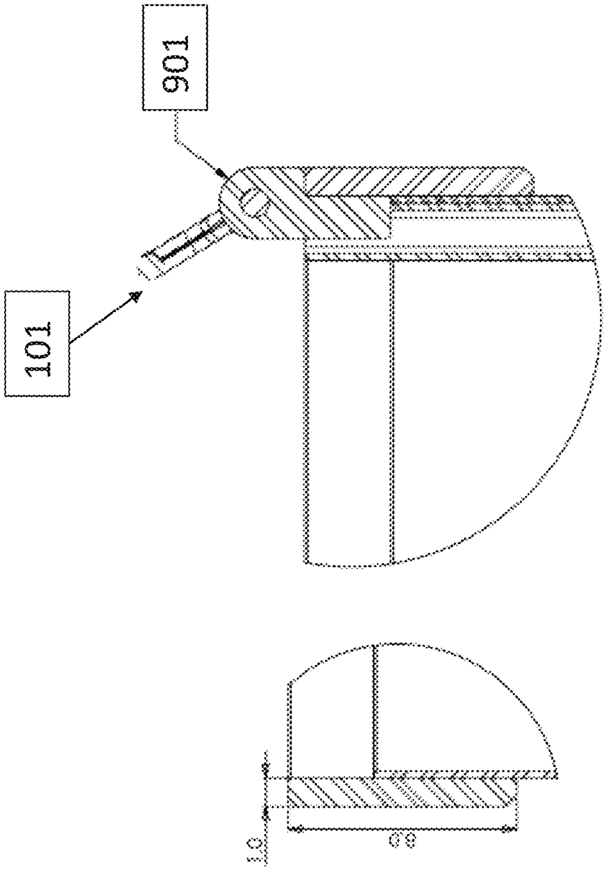
FIG. 9*a* and FIG. 9*b* are details of the interfaces of the top portion of the steel transfer container shown in FIG. 8.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of hazardous cargo storage and transportation. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The package and transport system in certain embodiments consists of a reusable steel liner 100, water proof bag insert 1700, and a lid assembly 102. One lid mates with current power plant fill systems and the other mates with the water proof bag and allows the bag to be sealed for transport and disposal. In certain of the embodiments, each of the lids mates with the other.

The filled bag will be removed from the reusable steel liner and placed directly into a disposal MCC (Modular Concrete Canister—disposal vault) as occurs in existing disposal techniques using rigid liners. The bag and waste will slump inside the MCC to fully utilize the interior volume of the MCC (about 322 cubic feet) accommodating nominally two 160 cf shipments. This compares to 3 MCCs for the predominant 120 cf rigid liner currently used.

In certain embodiments, the disclosure is designed to meet the minimum performance levels in some or all of the specifications in the Code of Federal Regulations, namely 49 CFR Part 173, Sections 24, 24a, 24b, 37, 410, and 411 (i.e., 49 CFR §§ 173.24, 173.24a, 173.24b, 173.37, 173.410, 173.411). These are the Code of Federal regulations entitled, respectively, *General requirements for packagings and packages, Additional general requirements for non-bulk packagings and packages, Additional general requirements for bulk packagings, Hazardous Materials in Flexible Bulk Containers, General design requirements*, and *Industrial packagings*. As such, these sections of the Code of Federal Regulations are incorporated in their entirety. The disclosure herein is intended to reach modifications of the existing standards and to cover situations in which no or different standards apply.

In certain embodiments, a new bag assembly can be installed into the reusable liner for return to the customer for reuse.

Among the technical challenges in the art, certain areas are focused on in this disclosure. The first is mating to current fill-head designs and systems at the power plants. Others have designed and provided most of the fill-head systems and these have evolved in complexity (remote control) over the years. The current disclosure includes a mating system that s replicated between the disclosed bag and existing plants so that no changes are needed at the plants. Advantages of this design includes accelerated change-over to the present design because of a lack of delay due to the power plants resisting change, a complicated process which would require engineering support, new procedures, training and other time and cost intensive matters to support a transfer. The second major technical challenge solved by certain of the embodiments disclosed herein is withdrawing the bag from the liner and disposing in an ALARA (As low as is reasonably achievable) manner, which is intended to minimize radioactive or otherwise harmful exposure. The challenge of removal as disclosed herein can be largely overcome with initial bag strap design and the use of the reusable steel liner. The ALARA concerns result from accomplishing the desired objective of filling the MCCs to near full capacity, which creates a larger radiation source. In practice, under many embodiments of the present disclosure, only about a foot of headspace will be available for grout (shielding). However, this disclosure encompasses headspace both greater and lesser than one foot. The major operation that is affected is the lifting of the loaded MCC as in certain embodiments the MCC lid has to be removed to lift the MCC and requires hand rigging. One partial solution is a Hematite aggregate to make the MCCs. Hematite aggregate is denser and provides improved personnel shielding. Long handled reach tools and local shielding are other techniques that can be practices with the present embodiments that can be used to reduce exposures.

In certain embodiments, the package has three major components: the steel transfer container (STC), the lid that sits on the STC and includes a closure device to prevent spillage of contents when moving, and the expandable disposable liner located inside the STC and connected to the lid. It holds the waste and has the ability to slump when placed inside the MCC. In certain embodiments, these three major components comprise the complete enclosure and containment of the expandable liner system (ELS). In certain embodiments, the STC is made of carbon steel with a suitable protective and easily decontaminated coating and will facilitate insertion and removal of the Expandable Disposal Liner (EDL). This disclosure is intended to cover existing coatings and such coatings as will be developed in the future. In certain embodiments, the STC and integrated ELS is designed to have reception ports that are substantially identical in critical dimensions to the containers currently in use by nuclear power plants in the existing art such that the devices under the present disclosure can be utilized with existing plants. This allows for easy use and compatibility with existing infrastructure and hardware, increasing efficiency and decreasing costs.

In certain embodiments, as shown in FIGS. 1-16, the STC 100 is a rigid container constructed from carbon steel and having sufficient reinforcement at the top edge to maintain it round within ⅛", this disclosure however encompasses larger tolerances The STC in certain embodiments is of such thickness to ensure its ability to maintain shape, contain the materials, and support the load weight plus itself. In some embodiments, the STC incorporates lifting slings 101 in a 4 point configuration onto 4 lugs 901 welded to the container and rated at 10,000 pounds with a design margin of 5, assuming 100 pounds per cubic foot as the specific mass of the contents or maximum content load of 10,000 pounds. This exceeds US Department of Transportation requirements in its relevant regulations, including 49 CFR 173.410. In certain embodiments, the STC facilitates easy overhead lifting of the STC and its contents with its own wire rope slings. In some embodiments, a suitable grapple solution is employed. In those embodiments, it will also fit into other existing Type B Casks in operation in the existing art (e.g., RT-100, 10-160B) as well as Type A casks. The carbon steel liner can be coated with a wear resistant coating which will prevent corrosion of the carbon steel material and not be significantly worn when cycled into and out of casks and shield cylinders. In one particular embodiment, the STC can be constructed with internal dimensions of 57"Ø×68" H.

Figure 10:
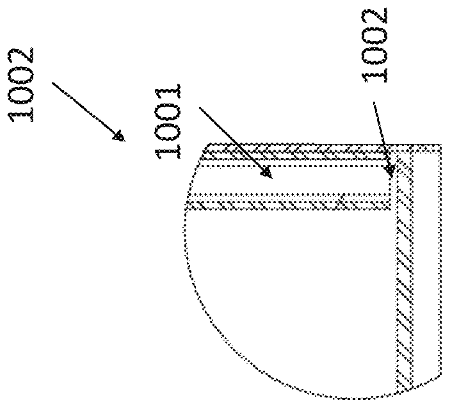
FIG. 10 is a detail of the interface of the bottom portion of the steel transfer container shown in FIG. 8.

In some embodiments, the interior of the STC where the lifting lugs are located has some material construction to the bottom of the container to prevent a snag point for the EDL when it is being extracted. These constructed components can be dual purpose, and may be hollow to allow suction relief for EDL extraction, as shown in FIG. 10. If hollow they may be designed for removal and decontamination. This construction can be a ventilation shaft or a double-lined portion 1001 of the STC that allows the passage of air from the top of the device to the bottom via an opening 1002 between the passage and the interior of the STC.

The liner in some embodiments will fit inside the 8-120 B Cask, the smallest void dimensions of the US Type B Waste Casks and all US Waste disposal site caissons but also has the capability to have the internal flexible liner and lid removed and placed into a MCC for disposal at close to the real waste volume in the container void.

Figure 19:
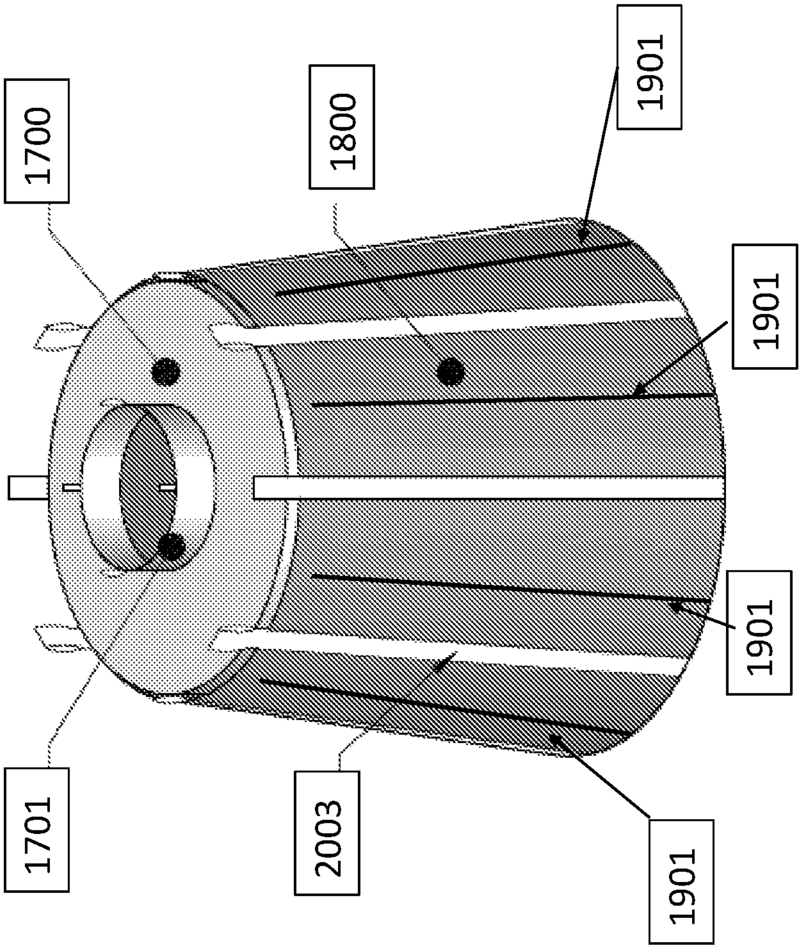
FIG. 19 is an isometric view of an embodiment of the inner layer within the outer layer of the combined system.
Figure 20:
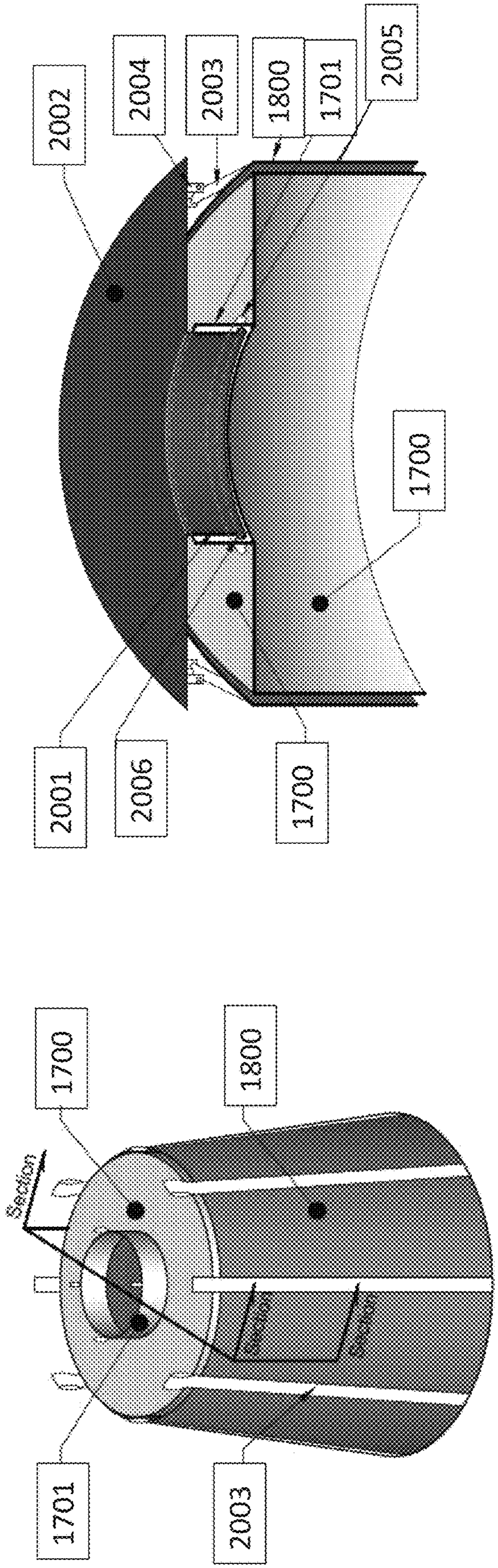
FIG. 20 is a isometric view of an embodiment of the inner layer with a sectional mark and a sectional view from the same mark.

The slumping bag (the EDL or soft sided liner) in certain embodiments is formed with pleats or other similar design to allow a smaller or larger volume as waste is presented to the container. In a particular embodiment, as shown in FIG. 19, the EDL is constructed with a plurality (e.g., 6 or more) deep pleats 1901 in its sides, running approximately vertically from a point near the bottom of the EDL to a point near the top of the EDL, and arranging circumferentially about the EDL. In some embodiments, these pleats are folded when the EDL inside the STC, but when extracted, allow the EDL to expand to the 80" diameter of the MCC and slump in height. The EDL can be sized differently for differently sized MCCs and STCs. As shown in FIG. 20, the EDL in these embodiments comprises a 2-layered pliable flexible container made of polymers. The inner layer or bladder 1700 of the EDL is water-tight and strong enough to hold its contents in the various positions it is expected to be in during use, including through lifting, and the outer layer 1800 is tough and resistant to punctures or made of puncture proof material 1801. The outer layer 1800 further is preferably a heavy constructed expandable material intended to provide the structural strength for lifting and containing the inner flexible 1700 water-tight layer. The inner layer 1700 can be leak-tight have an upward facing opening 1701. The inner layer or bladder 1700 and can fastened by flange 2001 to the underside of the removeable STC lid 2002 but not connected to the STC. The portion of the inner layer or bladder, the bladder spout 1701, that connects to the flange 2001 can be a separately constructed portion or simply a continuation of the material of the inner portion and may or may not have extension tabs 1702 to aid in pulling the bladder spout 1701 over the down spout 2001 of the lid. The connection can be via a ring 2005 compressing the inner layer or bladder material against the down spout 2001 and held in place by a lip or flange 2006 at the bottom of the down spout 2001 or otherwise. It can be removed with the STC lid freely. The EDL in these embodiments is connected to the lid by webbing straps 2003 which are held to the bottom of the STC lid by pins 2004. This combined system meets a design margin of 5:1 expected loads. Other design margins are within the scope of this disclosure. In certain embodiments, the EDL can be connected to the STC lid but free from the STC. In those embodiments, a user can lift the STC lid by its wire rope slings out of the STC with the EDL attached with no encumbrances by attaching to lid lifting points 102. In certain embodiments, the EDL has room to accommodate the filter assembly, is fastenable (e.g., via bolts) to the bottom of the STC lid at a larger diameter than the fill head and opening so as not to interfere with the fillhead adapter plate and the connection between the inner layer or bladder and the STC lid. In certain embodiments, the EDL fits within a STC. The EDL is removable from the STC once filled with IXR (or other material) and when removed from the STC, the EDL expands to a diameter greater than or equal to 80", resulting in a displaced height of approximately 48". In some embodiments, the EDLs lifting arrangement is a 6 point webbing assembly with 3 straps 2003 in "basket" formation with a design margin (assume 100 pounds per cubic foot as the specific mass of the contents or maximum content load of 10,000 lb). The lifting straps 2003 run through sleeves in the outside of the outer layer of the EDL so as not to affect the EDL expansion. In some embodiments, each lifting attachment can be withstand a minimum safety factor of five (5) and is be of such length with respect to the flanged opening, that the EDL will not place load on the flange. In certain embodiments, the EDL should comply with 10 CFR. § 173.411 as an Industrial Package Type 1.

In some embodiments, the number of pleats is varied. In certain other embodiments, the EDL is of a smooth single material with no pleats. In these embodiments, the material is foldable and folds and expands based on the natural relaxation of the material. In certain embodiments, the EDL is approximately frustoconical in shape with a 65 inch height, with a 76 inch diameter base tapering to a 61 inch diameter top opening 1803, creating a large frustoconical inner volume 1802. Around the periphery of the device in this embodiment are a set of eight lift straps capable of attaching to the metal lid of the steel transfer container (STC) or other apparatus designed to be place above the EDL. The straps can be connected to the EDL by sewing or other appropriate method. In certain of these embodiments, the straps are 4 inches in width.

In certain of these embodiments, the EDL has an interior bladder 1700. A preferred thickness of the bladder is 60 thousandths of an inch (mils) in a preferred embodiment of PVC construction. The interior bladder can be placed within the EDL and have an opening at the top to mate with the STC lid. In certain of the embodiments, the bladder mates with the STC lid via a ring clamp. In a typical embodiment, the STC lid has or is adapted to receive a spout directed inwardly toward the interior of the STC. This spout has a means for sealing and supporting the connection between the bladder and the STC. The bladder can have an upwardly directed fill spout that is adapted to encircle the downwardly directed spout of the lid. When utilized, the bladder spout makes a sealed channel clamped to the outside of the downward spout. In certain of the embodiments, the bladder when expanded is generally cylindrical in shape, with a height of 67 inches without the up-spout, 73 inches including the 6 inch up-spout. The faces of the cylindrical shape in this embodiment have a 63 inch diameter, with the top face having an up-spout with a 23.5 inch diameter placed to mate with the down-spout of the STC lid. In appropriate embodiments, the bladder lift capacity given the PVC material of the bladder and the eight lift straps has a lifting capacity of 7,000 pounds. Upon lifting the filled combined EDL and bladder, the EDL and bladder tend to shape as tear drops on the bottom, resulting in an approximately spherical base, which pulls inwardly the sides, reducing the effective diameter of the EDL and bladder, making it possible to fit within and be lifted out of cask liners of smaller diameters than the nominal diameter of the bag.

Figure 13:
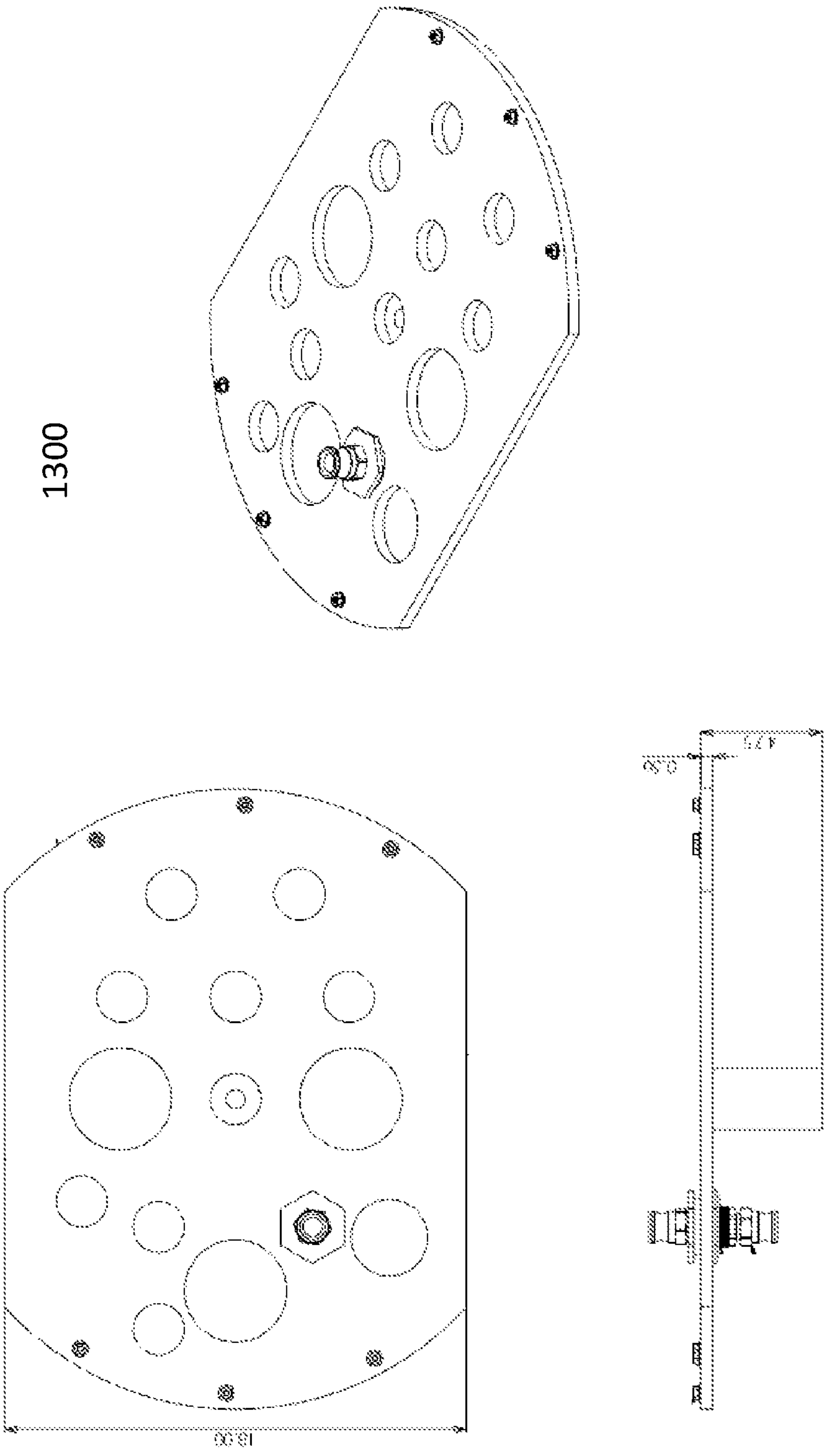
FIG. 13 is a top view, an isometric view, and a side view of the fillhead adapter plate of an embodiment of the present disclosure.
Figure 14:
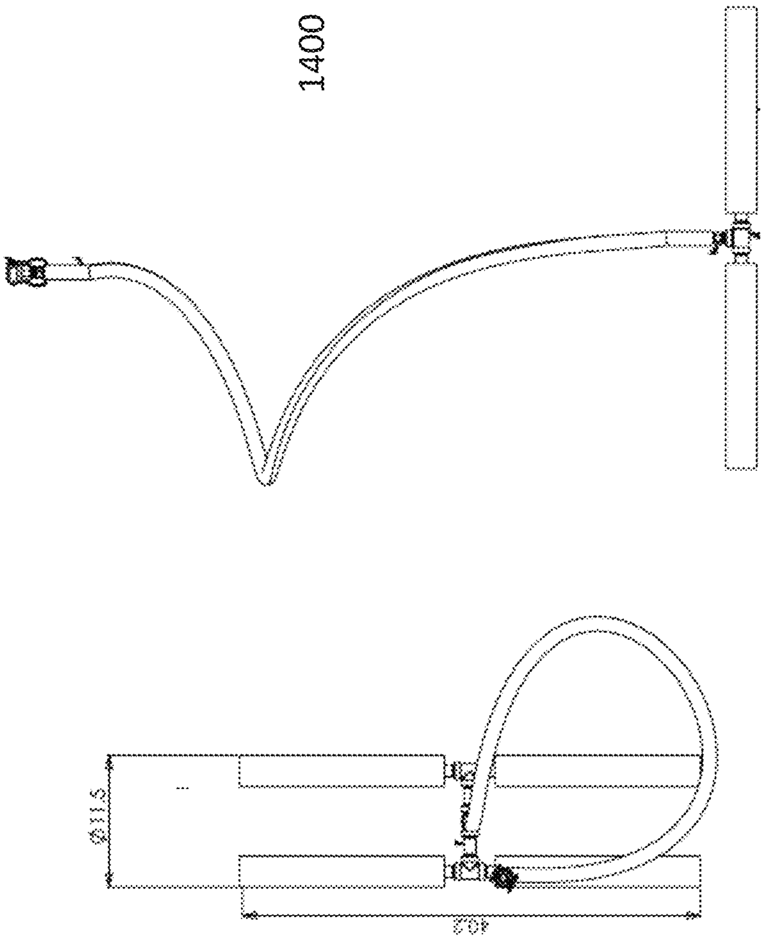
FIG. 14 is a top view and a side view of an embodiment of a dewatering array.
Figure 15:
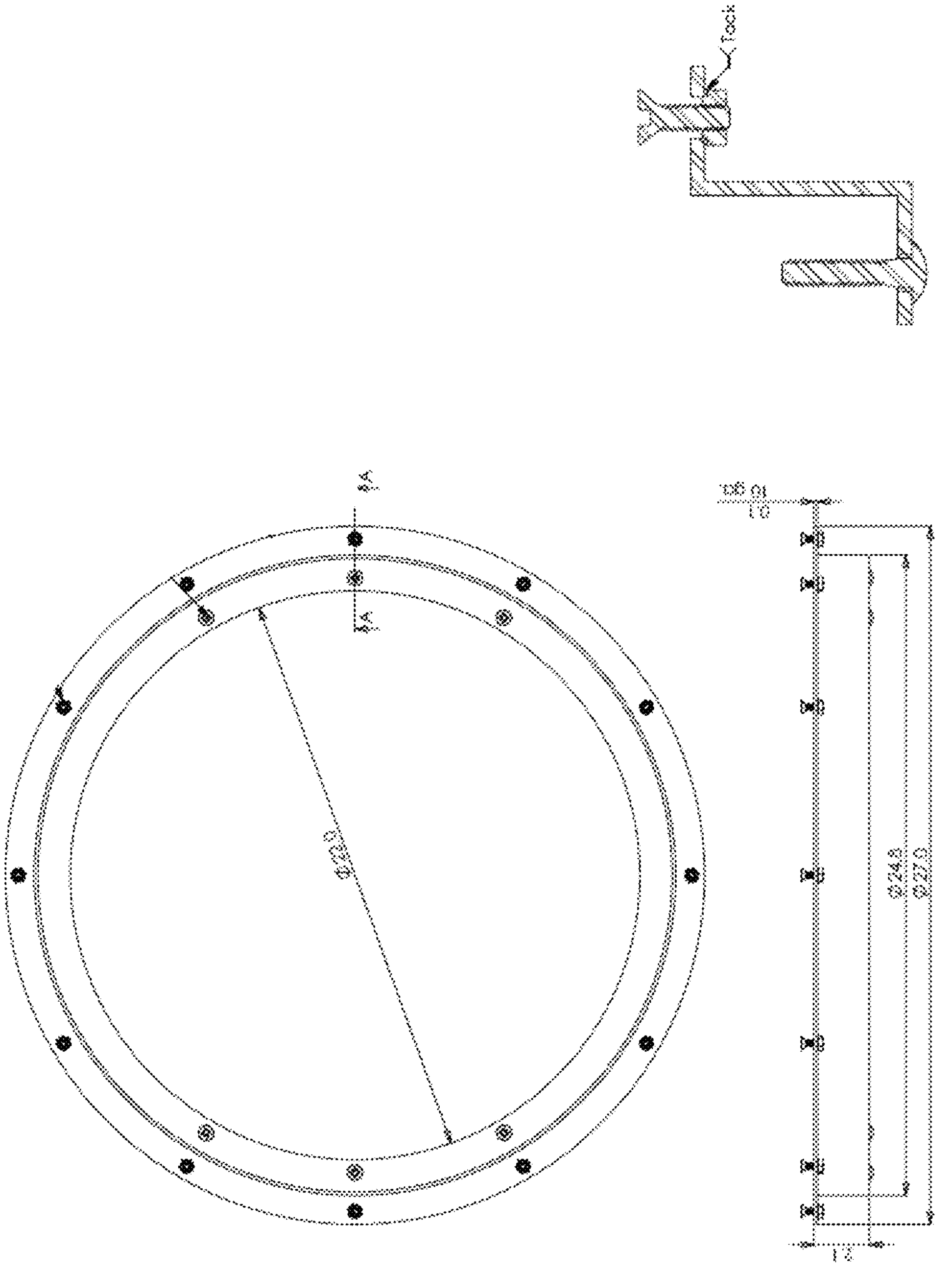
FIG. 15 is a top view and a side view of a fillhead adapter ring, and a detail of the fillhead adapter ring taken at A-A.

In certain embodiments, a fill head and adapter plate or ring is employed. In a preferred embodiment, these components are constructed of carbon or stainless steel. One variant is shown in FIG. 13. In some embodiments, The fillhead interface 1300 is a metal or composite round (or nearly round) plate no greater than 24.5" in diameter suitably fastened on the bottom side between the fill plate and the liner opening support flange. The top surface in some embodiments contains a gasket to seal against the fillhead surface. The filter array in a preferred embodiment is connected to the ¾" male camlock (or equivalent) connection on the bottom side of the fill plate at the port which is used for dewatering the liner. The topside of the plate in this embodiment matches the self-engaging dewatering system/self-engaging rapid dewatering system (SEDS/SERDS) fillhead and engagement female screw port in the center or similar fillhead systems. The fillplate supports the weight of the SEDS/SERDS fillhead, attached hoses and transient water/resin coursing through it during operation. The fillplate in the preferred embodiments does not interfere with lid closure device. Certain versions of this component attach to both the EDL and the STC to allow support and correct interface with nuclear power plant fill head designs where resin is inserted into the EDL. In certain embodiments, the fill head and adapter plate ring are attached to the STC lid at its opening, while the EDL is attached at a larger diameter to the STC lid in such a way that neither interferes with the other and the opening is sealed to the EDL. Certain embodiments incorporate a universal design, with an opening and support which should be able to incorporate any fillhead adapter plate currently in use. The adapter support ring in certain embodiments interfaces with the SEDS/SERDS plate or similar systems. In this arrangement the fillhead and adapter plate/ring will not interfere with the EDL, is part of the STC lid (described below), is universal in dimensions for nuclear power plant fill head adapter plates and will be covered by the STC lid closure device. Embodiments have a closure device to prevent spillage of resin during handling and transport. The closure device in certain embodiments is a flat gasketed cover which fits over the fillhead adapter plate opening in the STC lid and uses an external operator to screw shaft into the Energy Solutions SEDS/SERDS fill plate to bring the closure device snug against the STC Lid opening at its gasket.

Figure 11:
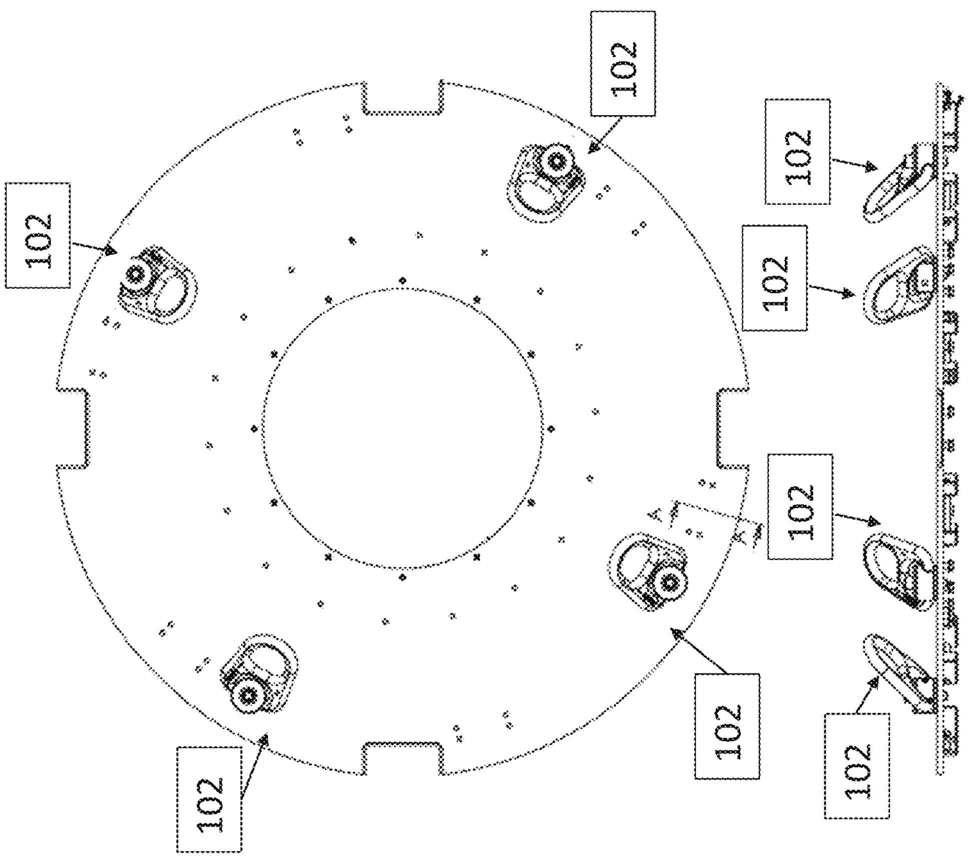
FIG. 11 is a top view and a side view of the outer lid of an embodiment of the present disclosure, that serves as a fill-head adapter plate.
Figure 12:
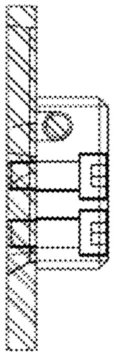
FIG. 12 is a sectional side view of a portion of the outer lid shown in FIG. 11, taken at A-A.
Figure 16:
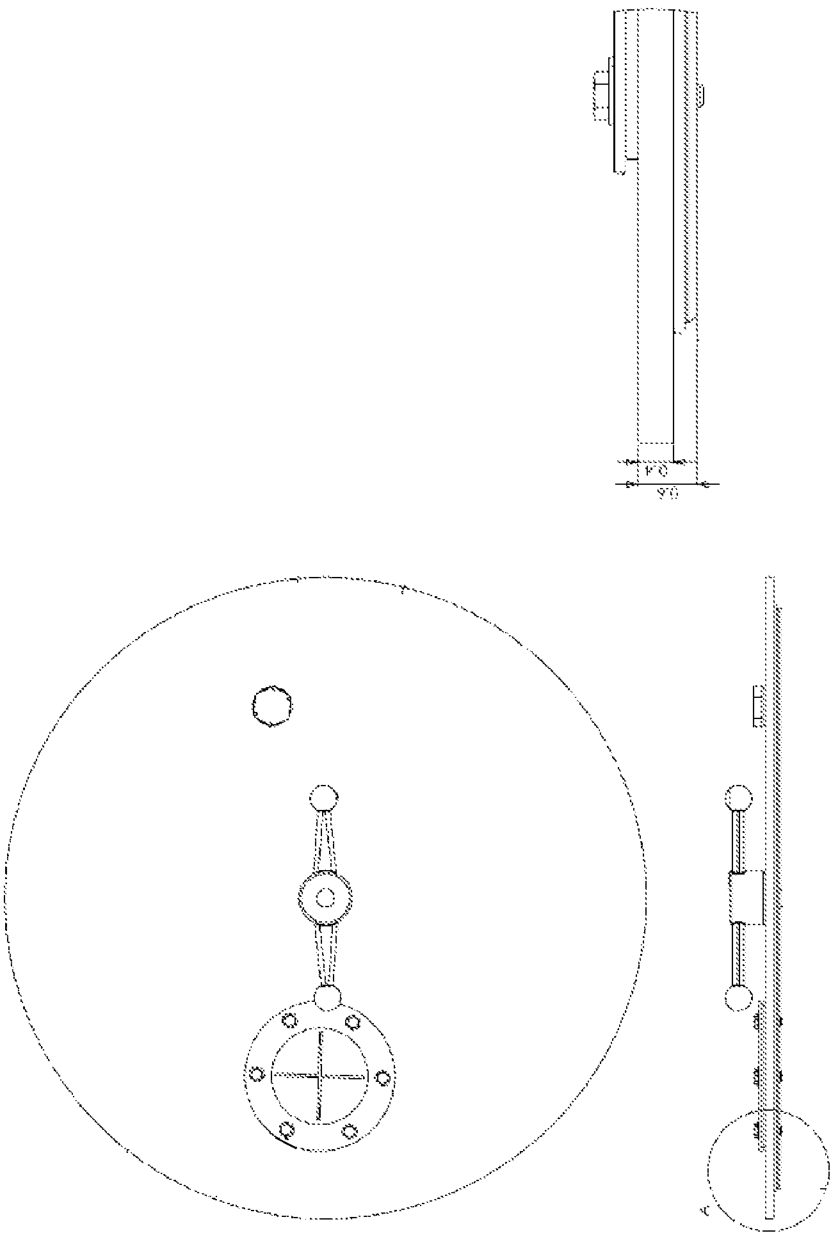
FIG. 16 is a top view, side view, and detail at A of a container lid.
Figure 17:
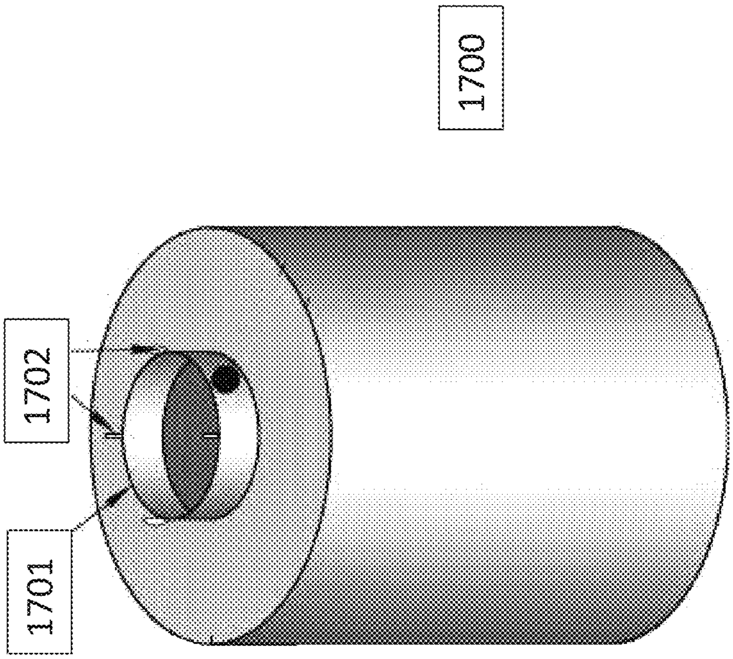
FIG. 17 is an isometric view of an embodiment of the inner layer of the combined system.
Figure 18:
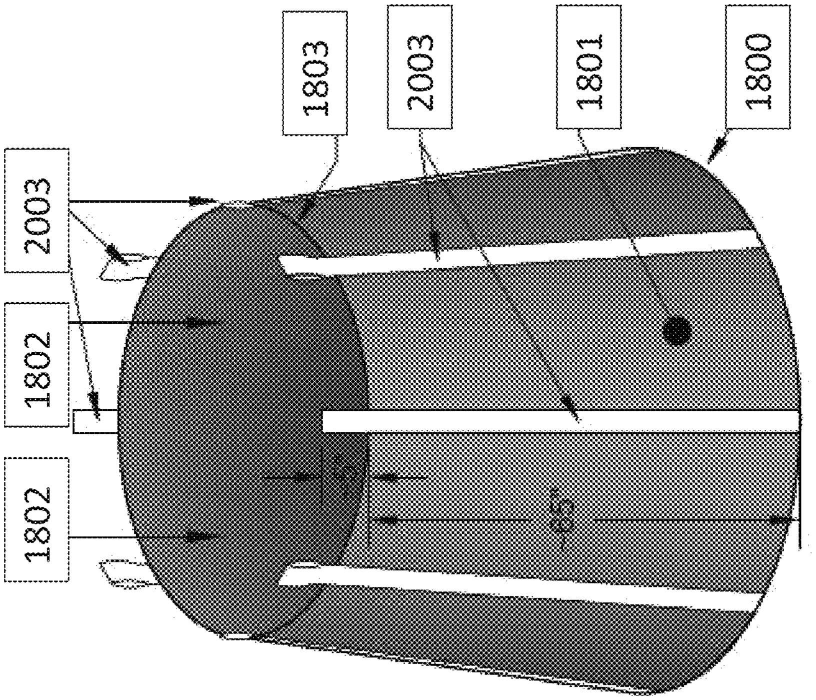
FIG. 18 is an isometric view of an embodiment of the outer layer of the combined system.

Certain embodiments include a STC lid, an embodiment of which is shown in FIGS. 11 and 16. The lid and its attachments in certain embodiments are constructed of carbon steel or stainless steel (with those parts constructed of carbon steel coated to prevent corrosion) and suitable rubberized gaskets for requisite sealing surfaces. The attachments to the lid are suitably fastened by threaded fasteners or welding as required. The lid in certain embodiments fits snuggle onto the STC with the notches along the periphery lined up over the STC shackles/lugs and alignment pins. The lid lifting devices in this embodiment are arranged as a 4 point lifting system in some embodiments. The lid's lifting lugs can be threaded into the lid and may, in conjunction with the lid and the webbing strap hangars, be able to withstand the assumed load with a safety margin of five, assuming 100 pounds per cubic foot as the specific mass of the contents or maximum content load of 10,000 lb. In some embodiments, the EDL will connect to the lid by straps which are connected via dowels in the webbing strap hangars, which transfers the EDL load to the lid, and by a flange ring which is fastened to the lid around the lid opening to create a leak tight barrier. The closure device of some embodiments incorporates features to enable an easier punch-through port for disposal site injection of solidification agent and a HEPA vent port to enable equalization of the packaging internals to its environment. In the approximate center of the lid in certain embodiments and under the closure device, a support ring is attached which provides a universal means of attaching various fillplate adapters. Preferably, these adapters and the support ring support the load of the customer fillhead, whereas this load is transferred to the lid via the ring, during filling operations and provide a threaded detent for the closure device.

Some embodiments include a filter assembly. The filter assembly preferably is a flexible and rigid assembly to filter IXR or other appropriate material from water and connect to the SEDS/SERDS fill plate adapter. It is in some embodiments constructed of materials which do not corrode in an aqueous environment. The filter assembly preferably fits within the EDL which is enclosed by the STC. The filter array fits within the following dimensions in a preferred embodiment: 57"Ø×68" H. The filter assembly is preferably disposable with the IXR, EDL, and lid. In that preferred embodiment, the filter assembly is pieced and inserted through a 24" circular opening into the container.

The present methods preferably include the following materials: the use of tough, rigid materials such as metal or composites for structure and support; durable rubber or equivalent for positive sealing with moderate compression; tough and durable polymers to ensure water tight barriers and strong enough to meet lifting criteria; lifting components designed to lift 10,000 pounds with a design margin of 5; chemical compatibility including at a minimum, material suitable to exposure to the following without measurable degradation to EDL performance: dilute quantities of EDTA, DTPA, hydroxy-carboxylic acids, and polycarboxylic acids (e.g., citric acid, carbolic acid, and glucinic acid, inorganic salts, pH>5 and <12 and incidental petroleum and synthetic oil. Also, preferably, EDL materials should be selected to be able to absorb 17.5 E5 Rads of radiological dose without measurable degradation to EDL performance, consistent with the maximum expected exposures from the highest activities anticipated for resins contained in a High Integrity Container (HIC) for 1 year.

Included in this disclosure is a container for hazardous waste, comprising a hangable bag having an interior volume, the hangable bag being constructed at least in part of collapsible material and configured to be lifted and configured to support an interior bladder, and the interior volume being variable; and an interior bladder, the interior bladder connectable with a through port to a lid.

Further included in this disclosure is the above container wherein the hangable bag has an initial diameter at a cross section, the hangable bag comprising a plurality of expandable pleats, wherein said expandable pleats are expandable to a second diameter greater than the initial diameter at the cross section.

Further included in this disclosure is the above container further comprising a lid having supports, the supports arranged to lift the hangable bag, and a through port; and wherein the hangable bag comprising lifting straps and the supports on the lid are lift strap connectors, mateable with the lifting straps.

Further included in this disclosure is the above container wherein the hangable bag is dimensioned to have a tapered shape.

Further included in this disclosure is the above container wherein the interior bladder comprises at least 60 mil PVC material.

Further included in this disclosure is the above container wherein the through port in the lid comprises a down spout, and the interior bladder is constrainable against the down spout with a ring clamp.

Further included in this disclosure is the above container further comprising a steel liner sized to receive the hangable bag, the lid, and the interior bladder.

Further included in this disclosure is the above container wherein the steel container is substantially cylindrical; the hangable bag is removable from the steel liner; and the expandable pleats are sized such that, when the hangable bag is removed from the steel liner, the second diameter is greater than a diameter of the steel liner.

Further included in this disclosure is the above container wherein the hangable bag comprises a substantially frustoconical section with a bottom edge and a top edge with smaller circumference than the bottom edge; and a substantially circular base section, the circumference of the substantially circular base section connected at the bottom edge of the frustoconical section; wherein the substantially frustoconical section and the base section are sized such that when the hangable bag is weighted with waste and lifted from the steel container, the diameter at the bottom edge of the frustoconical section is less than the diameter of the steel container and when the hanging bag is resting unsupported, the diameter at the bottom edge of the frustoconical section is greater than the diameter of the steel container.

Further included in this disclosure is the above container wherein the steel container further comprises a ventilation shaft positioned such that, when the hangable bag is instead the steel container, the ventilation shaft can supply air to an interior location of the steel container below the hangable bag.

Included in this disclosure is a waste storage container, comprising: a substantially cylindrical liner; a liftable lid adapted to be placed atop the cylindrical liner and to be lifted from the cylindrical liner; a flexible bag system comprising at least a first bag and a second bag, the first bag having an inner volume and adapted to hang from the liftable lid and to support the weight of the second bag, the second bag placeable inside the inner volume of the first bag and sealable.

Further included in this disclosure is the above container wherein the liftable lid further comprises a connection section, wherein the connection section is positioned to allow a connection with the second bag and the lid, and to allow a pass through section from above the lid to an inner volume of the second bag.

Further included in this disclosure is the above container wherein the liftable lid further is adaptable to mate with existing nuclear power plant fill heads.

Further included in this disclosure is the above container wherein the flexible bag system comprises a puncture resistant material and a water-proof material.

Further included in this disclosure is the above container wherein the flexible bag system comprises a plurality of expansion locations, wherein the expansion locations allow a horizontal dimension of the flexible bag system to exceed a horizontal dimension of the cylindrical liner when the flexible bag system is outside the cylindrical liner.

Included in this disclosure is a method of storing hazardous waste, comprising the steps of: attaching a multiple-part flexible bag system to a lid; suspending the flexible bag system within a steel liner; and filling the flexible bag system with hazardous waste.

Further included in this disclosure is the above method further comprising the steps of: removing at least one part of the flexible bag system from the steel liner containing the hazardous waste; placing the removed part of the flexible bag system into a modular concrete canister, wherein the removed part of the flexible bag system slumps within the modular concrete canister.

Further included in this disclosure is the above method wherein the multi-part flexible bag system comprises a hangable bag, the hangable bag being constructed at least in part of collapsible material and configured to be lifted; and an interior bladder, the interior bladder connectable to the lid.

Further included in this disclosure is the above method wherein the interior bladder comprises at least 60 mil PVC material.

Further included in this disclosure is the above method wherein the multiple-part flexible bag system comprises an initial diameter and an initial height; and a plurality of pleats arranged such that a volume of hazardous waste placed therein can expand the pleats, resulting in the flexible bag system having a second diameter larger than the initial diameter, and the second height smaller than the initial height.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. In addition to the above described interpretive guides, circumference and diameter are not intended to be used only with reference to circular items or cross sections, but rather to any shape with a measurable two-dimensional external portion and a crossing dimension. For example, as used in this specification, the circumference of a rectangle would be the sum of the lengths its sides and the diameter would be a length of a segment across the rectangle, the appropriate choice of segment apparent from context.

I claim:

1. A waste storage container, comprising:

a substantially cylindrical liner;

a liftable lid adapted to be placed atop the cylindrical liner and to be lifted from the cylindrical liner;

a flexible bag system comprising at least a first bag and a second bag, the first bag having an inner volume and adapted to hang from the liftable lid and to support a weight of the second bag, the second bag placeable inside the inner volume of the first bag and sealable, and the first bag and the second bag sized to be received by the cylindrical liner, wherein:

the second bag is connectable with a through port to the liftable lid, the flexible bag system is removable from the cylindrical liner, and the flexible bag system comprises a plurality of expansion locations, such that the plurality of expansion locations allow a horizontal dimension of the flexible bag system to exceed a horizontal dimension of the cylindrical liner when the flexible bag system is outside the cylindrical liner.

2. The waste storage container of claim 1 wherein the liftable lid further comprises a connection section, wherein the connection section is positioned to allow a connection with the second bag and the liftable lid, and to allow a pass through section from above the lid to an inner volume of the second bag.

3. The waste storage container of claim 2 wherein the liftable lid further is adaptable to mate with existing nuclear power plant fill heads.

4. The waste storage container of claim 1 wherein the flexible bag system comprises a puncture resistant material and a water-proof material.

5. The waste storage container of claim 1, wherein the first bag is dimensioned to have a tapered shape.

6. The waste storage container of claim 1, wherein the second bag comprises at least 60 mil PVC material.

7. The waste storage container of claim 1, wherein the through port in the liftable lid comprises a down spout, and the second bag is constrainable against the down spout with a ring clamp.

8. The waste storage container of claim 1, wherein the liftable lid includes supports, the supports arranged to lift the first bag;

and wherein the first bag comprising lifting straps and the supports on the liftable lid are lift strap connectors, mateable with the lifting straps.

9. The waste storage container of claim 1, wherein the cylindrical liner further comprises a ventilation shaft positioned such that, when the first bag is inside the cylindrical liner, the ventilation shaft supplies air to an interior location of the cylindrical liner below the first bag.

* * * * *